US012717838B2

(12) United States Patent
K

(10) Patent No.: US 12,717,838 B2
(45) Date of Patent: Aug. 25, 2026

(54) UTILIZING TEXT-BASED INPUT TO DYNAMIC SELECT AND PRESENT SPECIFIC PORTIONS OF AUDIOVISUAL CONTENT TO USER

(71) Applicant: DISH Network Technologies India Private Limited, Bangalore (IN)

(72) Inventor: Kunal Kini K, Bangalore (IN)

(73) Assignee: DISH NETWORK TECHNOLOGIES INDIA PRIVATE LIMITED, Bangalore (IN)

(*) Notice: Subject to any disclaimer, the term of this patent is extended or adjusted under 35 U.S.C. 154(b) by 0 days.

(21) Appl. No.: 18/614,253

(22) Filed: Mar. 22, 2024

(65) Prior Publication Data

US 2025/0209110 A1 Jun. 26, 2025

(30) Foreign Application Priority Data

Dec. 26, 2023 (IN) ............................. 202341088910

(51) Int. Cl.
*G06F 16/48* (2019.01)
*G10L 15/26* (2006.01)
*H04N 21/472* (2011.01)

(52) U.S. Cl.
CPC .............. *G06F 16/48* (2019.01); *G10L 15/26* (2013.01); *H04N 21/47217* (2013.01)

(58) Field of Classification Search
None
See application file for complete search history.

(56) References Cited

U.S. PATENT DOCUMENTS

2007/0250901 A1* 10/2007 McIntire .......... H04N 21/47815 348/E7.071
2011/0238754 A1 9/2011 Dasilva et al.
2014/0074851 A1 3/2014 Zhang et al.
2014/0074866 A1 3/2014 Shah et al.
2015/0347590 A1 12/2015 Kamotsky et al.
2017/0256289 A1* 9/2017 Smith ..................... G11B 27/11
2018/0213299 A1 7/2018 Park et al.
2019/0317985 A1* 10/2019 Di Paolo ............... G06F 16/334
2021/0042393 A1 2/2021 Ishikawa et al.
2021/0103615 A1 4/2021 Jindal et al.
2022/0132179 A1 4/2022 Bennett-James et al.
2023/0005075 A1 1/2023 Li et al.
2023/0101319 A1 3/2023 Ramachandiran et al.
(Continued)

*Primary Examiner* — Heather R Jones
(74) *Attorney, Agent, or Firm* — Seed Intellectual Property Law Group LLP

(57) ABSTRACT

Systems and methods for accessing particular content using string-based unique identifiers. A plurality of audiovisual content is accessed and analyzed for a plurality of text strings. For each corresponding text string of the plurality of text strings, a unique identifier is generated and a corresponding timestamp is determined for when the corresponding text string occurs within the corresponding content. A mapping between the timestamp and the unique identifier for the corresponding text string for the corresponding content is then stored. In response to receiving input from a user, a target unique identifier is determined based on the input. The target unique identifier and the mappings between timestamps and unique identifiers are employed to identify and present target content to the user.

15 Claims, 6 Drawing Sheets

(56) References Cited

U.S. PATENT DOCUMENTS

| | | | | |
|---|---|---|---|---|
| 2024/0095275 | A1 | 3/2024 | Tambi et al. | |
| 2024/0135973 | A1* | 4/2024 | Bai | G11B 27/031 |
| 2025/0200983 | A1 | 6/2025 | Li et al. | |

* cited by examiner

UTILIZING TEXT-BASED INPUT TO DYNAMIC SELECT AND PRESENT SPECIFIC PORTIONS OF AUDIOVISUAL CONTENT TO USER

BACKGROUND

Over the past few years, the amount of content that is available to a user has grown substantially. Likewise, users are consuming more and more content. Unfortunately, as the amount of content grows, the ability of the user to find or re-experience, or share, previously consumed content is becoming more difficult. It can be challenging for a user to remember the name of specific content that they have consumed. Without remembering the name of the content, users may rely on other information, such as the actors, genre, or a generic description of the content. But the user may not remember this information, or it may not be sufficient to locate the content. This inability to locate previously consumed content can be exaggerated when the user wants to re-experience a small portion of the previously consumed content, such as a specific scene. Many users do not remember where in the content that small portion is located. It is with respect to these and other considerations that the embodiments herein have been made.

BRIEF SUMMARY

Briefly, embodiments descried herein are directed to dynamically selecting and presenting content to a user based on unique string-based identifiers.

Prior to users attempting to select or access specific portions of content, unique identifier/timestamp mappings a determined. A plurality of audiovisual content is accessed and processed for unique identifier/timestamp mappings. For each corresponding content of the plurality of content, an audio portion of the corresponding content is converted into a plurality of text strings. A unique identifier is generated for each corresponding text string. Likewise, a corresponding timestamp is determined for the corresponding text string within the corresponding content. A mapping between the timestamp and the unique identifier for the corresponding text string for the corresponding content is then stored. The unique identifier/timestamp mappings may be stored in a remote database or as metadata of the corresponding content.

At some time after the unique identifier/timestamp mappings are stored for the plurality of content, an input may be received from a user. The input may include manually entered text or it may include an audio input that can be converted to input text. A target unique identifier is determined based on the input. The mappings may be employed to identify a timestamp that is mapped to the target unique identifier. In some embodiments, the timestamp can be used to adjust the playback of current content being presented to the user. In other embodiments, the timestamp can be used to clip a portion of target content, such that the clip is presented to the user.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term “herein” refers to the specification, claims, and drawings associated with the current application. The phrases “in one embodiment,” “in another embodiment,” “in various embodiments,” “in some embodiments,” “in other embodiments,” and other variations thereof refer to one or more features, structures, functions, limitations, or characteristics of the present disclosure, and are not limited to the same or different embodiments unless the context clearly dictates otherwise. As used herein, the term “or” is an inclusive “or” operator, and is equivalent to the phrases “A or B, or both” or “A or B or C, or any combination thereof,” and lists with additional elements are similarly treated. The term “based on” is not exclusive and allows for being based on additional features, functions, aspects, or limitations not described, unless the context clearly dictates otherwise. In addition, throughout the specification, the meaning of "a," "an," and "the" include singular and plural references.

References herein to the term "user" refer to a person or persons who is or are accessing content to be displayed on a display device. Accordingly, a "user" more generally refers to a person or persons consuming content. Although embodiments described herein utilize user in describing the details of the various embodiments, embodiments are not so limited. For example, in some implementations, the term "user" may be replaced with the term "viewer" throughout the embodiments described herein.

Figure 1:
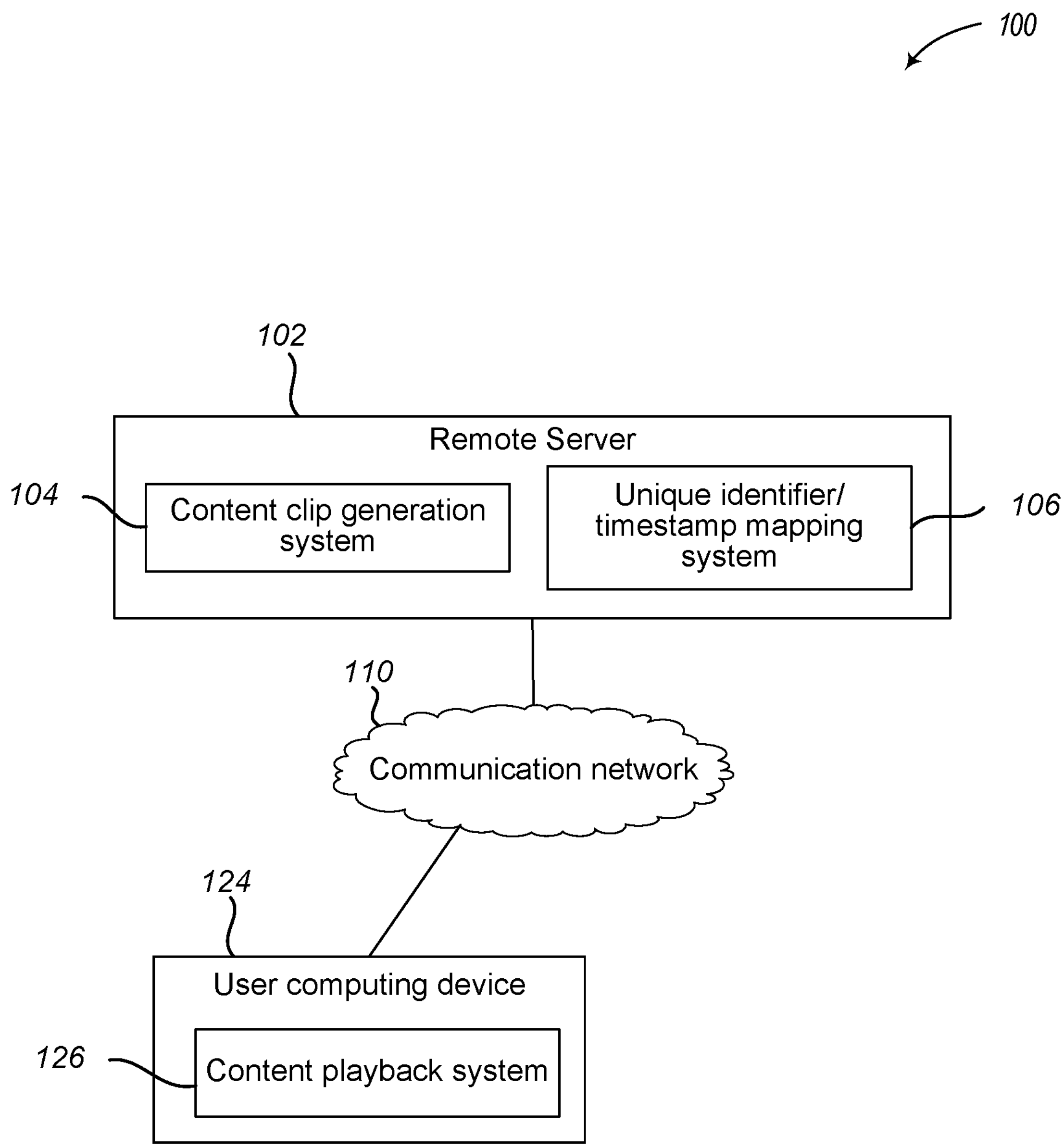
FIG. 1 illustrates a context diagram of an environment for enabling text-based selection and presentation of specific portions of audiovisual content in accordance with embodiments described herein.

FIG. 1 illustrates a context diagram of an environment 100 for enabling text-based selection and presentation of specific portions of audiovisual content in accordance with embodiments described herein. Environment 100 includes remote server 102, user computing device 124, and communication network 110. Communication network 110 may be configured to couple various computing devices to transmit content/data from one or more devices to one or more other devices, which enables the user computing device 124 to communicate with the remote server 120. Communication network 110 may include one or more wired or wireless networks.

The remote server 102 is configured to generate unique identifier/timestamp mappings for a plurality of pieces of audiovisual content and to enable use of those mappings to provide content to a user of the user computing device 124. The audiovisual content may include movies, sitcoms, reality shows, talk shows, game shows, documentaries, infomercials, news programs, sports programs, songs, audio tracks, albums, podcasts, or the like. The remote server 102 may include a content clip generation system 104 and a unique identifier/timestamp mapping system 106. Briefly, the unique identifier/timestamp mapping system 106 generates unique identifiers for text strings within the audio portion of content and maps those unique identifiers to timestamps of where in the content those text strings occur. And briefly, the content clip generation system 104 extracts an audiovisual clip from content using the unique identifier/timestamp mappings and target text received from user computing device 124.

The user computing device 124 is configured to enable a user to input target text and to present content to the user based on the unique identifier/timestamp mappings generated by the remote server 102. Examples of the user computing device 124 may include, but are not limited to, a smartphone, a tablet computer, a set-top box, a cable connection box, a desktop computer, a laptop computer, a television receiver, or other content receivers. In some embodiments, the user computing device 124 may include a display device (not illustrated) for presenting content to a user. Such a display device may be any kind of visual content display device, such as, but not limited to a television, monitor, projector, or other display device. Although FIG. 1 illustrates a single user computing device 124, embodiments are not so limited and a plurality of user computing devices may be utilized or employed.

The user computing device 124 may include a content playback system 126. In some embodiments, the content playback system 126 may communicate with the remote server to receive a clip extracted by the content clip generation system 104 based on input received from the user of the user computing device 124. In other embodiments, the content playback system 126 may utilize user input and the unique identifier/timestamp mappings to adjust the playback content being currently presented to the user.

Figure 2:
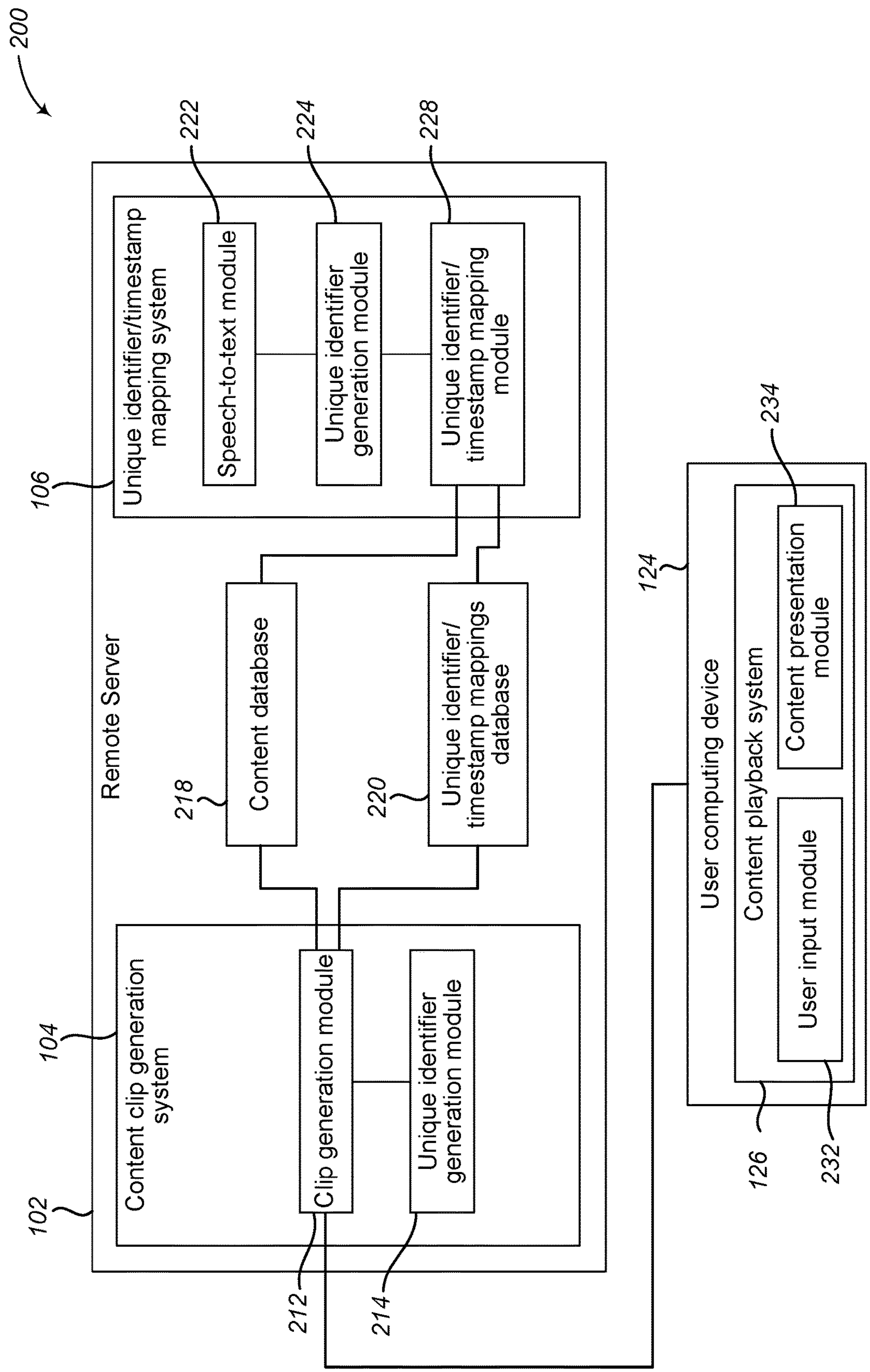
FIG. 2 is a context diagram of a non-limiting embodiment of systems for generating unique identifier/timestamp mappings for content for use in dynamically selecting and presenting specific portions of audiovisual content to a user in accordance with embodiments described herein.

FIG. 2 is a context diagram of a non-limiting embodiment of systems 200 for generating unique identifier/timestamp mappings for content for use in dynamically selecting and presenting specific portions of audiovisual content to a user in accordance with embodiments described herein. Systems 200 includes a remote server 102 and a user computing device 124, similar to environment 100 in FIG. 1. The remote server 102 includes a content clip generation system 104, a unique identifier/timestamp mapping system 106, and a content database 218.

The content database 218 stores, or enables access to, a plurality of pieces of audiovisual content. In some embodiments, the unique identifier/timestamp mapping system 106 may modify the metadata of corresponding content to include the unique identifier/timestamp mappings for that corresponding content, as determined by the unique identifier/timestamp mapping system 106. In other embodiments, the unique identifier/timestamp mappings may be stored separate from the content in the unique identifier/timestamp mappings database 220.

The unique identifier/timestamp mapping system 106 includes a speech-to-text module 222, a unique identifier generation module 224, and a unique identifier/timestamp mapping module 228.

The unique identifier/timestamp mapping module 228 is configured to access and obtain content from the content database 218. If a piece of selected content has not been previously processed, as described herein, the unique identifier/timestamp mapping module 228 may access the selected content such that unique identifier/timestamp mappings are generated for the selected content. The unique identifier/timestamp mapping module 228 provides the selected content to the unique identifier generation module 224 and receives one or more unique identifiers for the selected content in response. In some embodiments, the content management module 226 may also receive timestamps associated with each unique identifier from the unique identifier generation module 224. The unique identifier/timestamp mapping module 228 generates one or more unique identifier/timestamp mappings for the selected content. In some embodiments, the unique identifier/timestamp mapping module 228 stores the unique identifier/timestamp mappings, along with a mapping to the selected content, in the unique identifier/timestamp mappings database 220. In other embodiments, the unique identifier/timestamp mapping module 228 may store the unique identifier/timestamp mappings in the metadata of the selected content stored by content database 218.

The unique identifier generation module 224 receives the selected content from the unique identifier/timestamp mapping module 228 and provides an audio portion of the selected content to the speech-to-text module 222. The unique identifier generation module 224 receives a document identifying the text of the selected content. The unique identifier generation module 224 is configured to convert that text into a plurality of text strings. In various embodiments, the unique identifier generation module 224 analyzes the text for pauses, breaks, phrases, or other spoken criteria to identify the plurality of text strings. The unique identifier generation module 224 is configured to convert each text string into a unique identifier. In some embodiments, a hash or other mathematical function can be applied to the text strings to generate the unique identifiers. The unique identifier generation module 224 can then provide the unique identifiers, along with the corresponding timestamps of the text strings, to the unique identifier/timestamp mapping module 228.

The speech-to-text module 222, is configured to receive the audio portion of the selected content from the unique identifier generation module 224 and to convert the audio portion to text. The speech-to-text module 222 returns the text, along with timestamps indicating when the text was uttered in the audio portion of the selected content, to the unique identifier generation module 224.

The content clip generation system 104 may include a clip generation module 212 and a unique identifier generation module 214.

The clip generation module 212 is configured to receive target text from the user computing device 124. The clip generation module 212 provides the target text to the unique identifier generation module 214. The unique identifier generation module 214 may employ embodiments similar to the unique identifier generation module 224 to generate a target unique identifier from the target text. The clip generation module 212 utilizes this target unique identifier to search the unique identifier/timestamp mappings database 220 for content and corresponding timestamps associated with the target unique identifier. The clip generation module 212 is configured to use the content and corresponding timestamps for the corresponding target unique identifier to access the content database 218 and generate one or more content clips. The content generation module 212 can then provide these clips to the user computing device 124 for presentation to a user.

In various embodiments, the user computing device 124 includes a content playback system 126. The content playback system 126 can include a content presentation module 234 and a user input module 232. The user input module 232 may be configured to receive user input that can be converted into target text. In some embodiments, the content presentation module 234 may utilize the target text to request one or more clips containing the target text from the remote server 102. In other embodiments, the content presentation module 234 may generate a target unique identifier for the target text, obtain correspondingly mapped timestamps (e.g., by accessing the unique identifier/timestamp mappings database 220 or searching metadata of content currently being presented to the user), and adjust the playback of content to the obtained timestamp.

Although the content clip generation system 104 and the unique identifier/timestamp mapping system 106 are illustrated as separate systems, embodiments are not so limited. Rather, a single system or a plurality of systems may be utilized to implement the functionality of the content clip generation system 104 and the unique identifier/timestamp mapping system 106. Similarly, although the speech-to-text module 222, the unique identifier generation module 224, the unique identifier/timestamp mapping module 228, the clip generation module 212, and the unique identifier generation module 214 are illustrated separately, embodiments are not so limited. Rather, one module or a plurality of modules may be utilized to implement the functionality of the speech-to-text module 222, the unique identifier generation module 224, the unique identifier/timestamp mapping module 228, the clip generation module 212, and the unique identifier generation module 214.

The operation of certain aspects will now be described with respect to FIGS. 3-5. Processes 300, 400, and 500 described in conjunction with FIGS. 3-5, respectively, may be implemented individually or collectively by one or more processors or executed individually or collectively via circuitry on one or more specialized computing devices, such as remote server 102 or user device 124 in FIG. 1.

Figure 3:
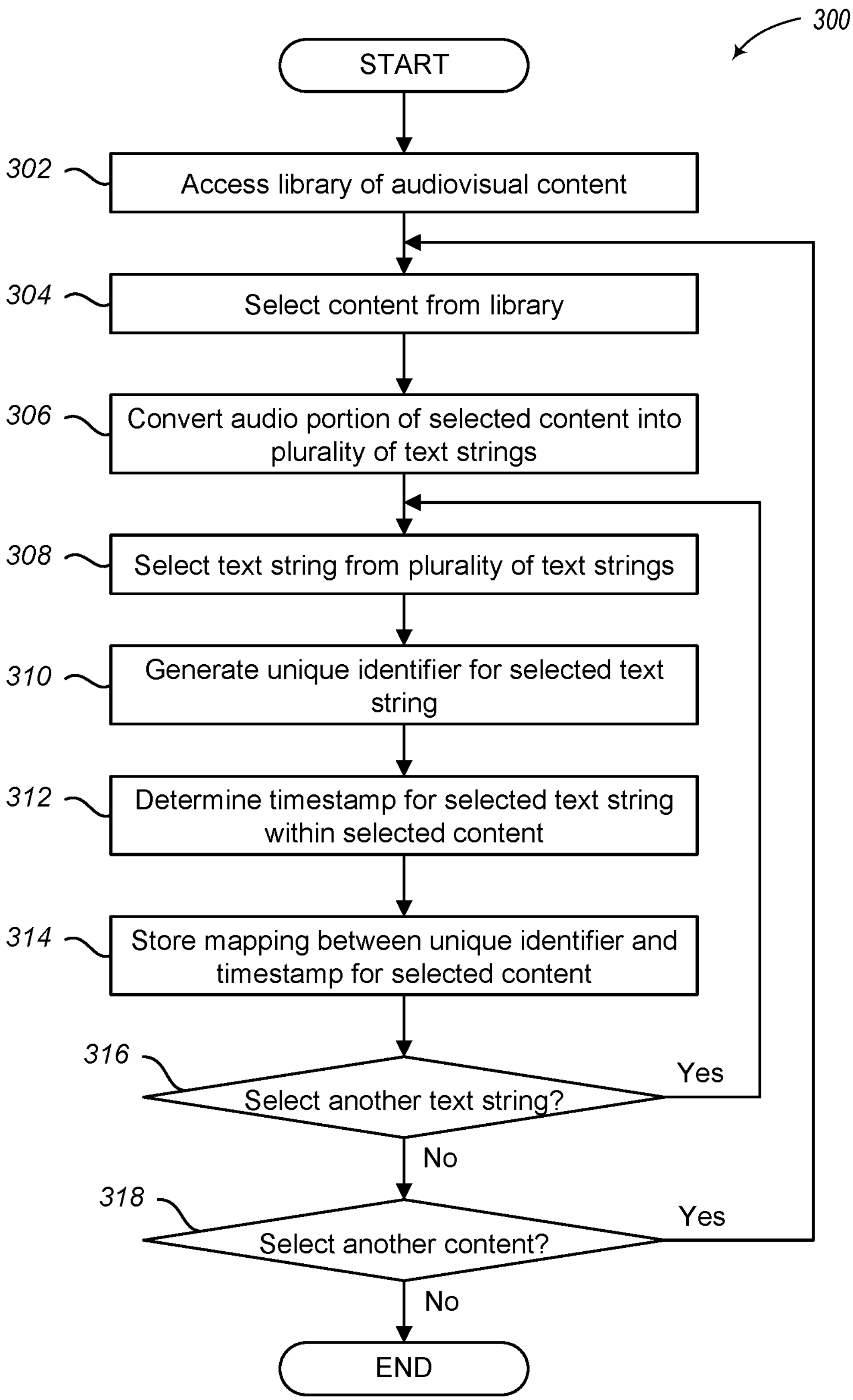
FIG. 3 illustrates a logical flow diagram showing one embodiment of a process for mapping unique identifiers and corresponding timestamps for text strings associated with audiovisual content in accordance with embodiments described herein.

FIG. 3 illustrates a logical flow diagram showing one embodiment of a process 300 for mapping unique identifiers and corresponding timestamps for text strings associated with audiovisual content in accordance with embodiments described herein.

Process 300 begins, after a start block, at block 302, where a library of audiovisual content is accessed. In various embodiments, the library contains a plurality of separate pieces of audiovisual content. The audiovisual content may include movies, television shows, replays of sporting events, replays of concerts, etc. In some embodiments, the library may be stored by or remotely from the computing device performing process 300.

Process 300 proceeds after block 302 to block 304, where a piece of content is selected from the library. In some embodiments, a user may manually select the content. In other embodiments, the content is selected such that each piece of content in the library may be systematically selected and processed in accordance with embodiments described herein.

Process 300 continues after block 304 at block 306, where an audio portion of the selected content is converted into a plurality of text strings. One or more audio-to-text mechanism may be employed to convert the audio portion into text. Once converted to text, one or more rule-based mechanisms or machine learning mechanisms may be utilized separate the text into a plurality of text strings. These strings may include sentences, names, catchphrases, etc. One example of a text string is "Bond, James Bond." In other embodiments, pause points between words or phrases may be used to determine the start and stop of a text string.

Process 300 proceeds next after block 306 to block 308, where a text string is selected from the plurality of text strings. In some embodiments, a user may manually select the text string. In other embodiments, the text string may be selected such that each text string generated at block 306 may be systematically selected and processed in accordance with embodiments described herein.

Process 300 continues next after block 308 at block 310, where a unique identifier is generated and assigned to the selected text string. In some embodiments, a hash may be applied to the text string to convert it into a unique identifier. In other embodiments, each character or word in the text string may be assigned a value. These values can then be concatenated or otherwise combined to create the unique identifier for that corresponding text string.

Process 300 proceeds after block 310 to block 312, where a timestamp within the selected content is determined for the selected text string. The timestamp may be a numerical value or time code identifying a position or point in time in the selected content where the audio version of the selected text string is located. In at least one embodiment, the timestamp may be associated with the first utterance of the first word of the selected text string. In other embodiments, the timestamp may be associated with the last utterance of the last word of the selected text string. In yet other embodiments, the timestamp may be a median time between a start and end of the selected text string.

In some embodiments, the timestamp may also include a time duration indicating an amount of time in which the corresponding audio is presented in the selected content for the corresponding selected text string.

Process 300 continues after block 312 at block 314, where a mapping between the unique identifier and the timestamp are stored for the selected content. This mapping may be referred to as a unique identifier/timestamp mapping. In some embodiments, the mapping may be stored as metadata withing the selected content. In other embodiments, the mapping may be stored in a database of mappings. In this way, the database includes the unique identifier of the text string along with an identifier of the selected content and the corresponding timestamp.

In some embodiments, the same text string may be identified multiple times within the selected content. In this way, the unique identifier for that text string may be mapped to a plurality of timestamps—where each timestamp indicates a different instance of the same text string in the selected content. Likewise, the same text string may be identified in different pieces of content. In this way, the unique identifier for that text string may also be mapped to each separate piece of content that includes that text string and the corresponding timestamp(s) in that piece of content.

Process 300 proceeds after block 314 to decision block 316, where a determination is made whether to select another text string for the selected content. In some embodiments, a user may select another text string. In other embodiments, each text string is systematically selected, and if there is another string yet to be selected, then the next text string is selected.

As noted above, the same text string may be located multiple times within the selected content. Each instance of a text string may be individually selected such that each corresponding timestamp is identified and mapped to the unique identifier for that text string. In other embodiments, a single instance of a text string may be selected and all corresponding timestamps for the text string may be determined and mapped to the unique identifier for that text string.

If another text string is to be selected, then process 300 loops to block 308 to select another text string; otherwise, process 300 flows to decision block 318.

At decision block 318, a determination is made whether to select another piece of content. In some embodiments, a user may select another piece of content. In other embodiments, another piece of content may be selected if the library of content is being systematically processed and there is an unselected and unprocessed content remaining in the library. If another piece of content is to be selected, process 300 loops to block 304; otherwise, process terminates or otherwise returns to a calling process to perform other actions.

Figure 4:
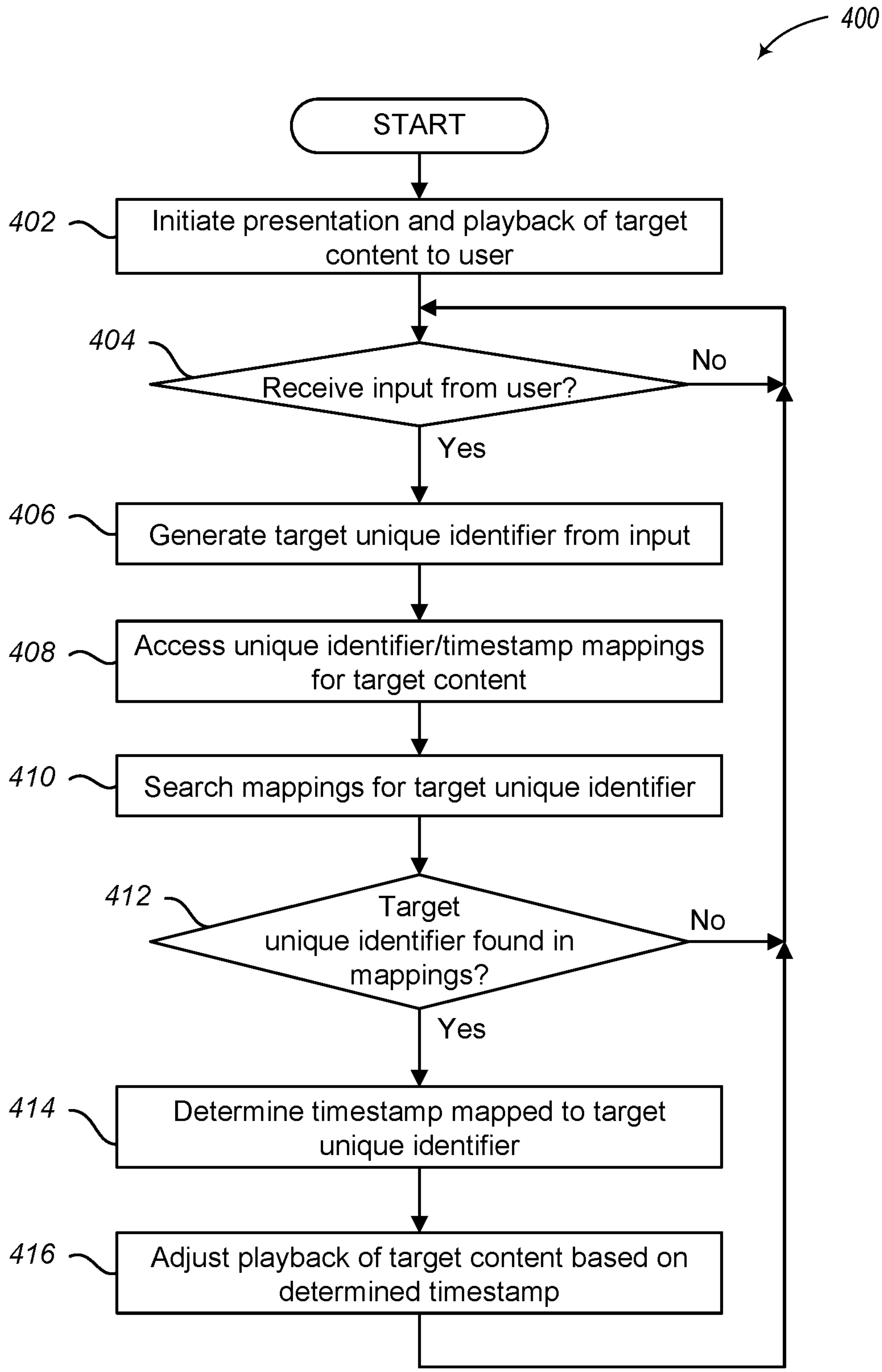
FIG. 4 illustrates a logical flow diagram showing one embodiment of a process for adjusting playback of content using a unique identifier for target text provided by a user in accordance with embodiments described herein.

FIG. 4 illustrates a logical flow diagram showing one embodiment of a process 400 for adjusting playback of target content using a unique identifier for target text provided by a user in accordance with embodiments described herein.

Process 400 begins, after a start block, at block 402, where presentation and playback of target content to a user is initiated. In some embodiments, the user selects and starts playback of the target content, such that the target content is presented to the user.

Process 400 proceeds after block 402 to decision block 404, where a determination is made whether an input containing target text has been received from the user prior to or during playback of the target content. In some embodiments, the user may manually type the target text into a graphical user interface. In other embodiments, the user may speak the target text into a microphone. In this situation, the user device, or another computing device, may convert the audio from the user's speech into the target text.

As one example, the user may be watching the James Bond movie "Dr. No" and may want to view the portion of the movie where the James Bond says "Bond, James Bond." As such, the user may input the phrase "Bond, James Bond."

If an input is received from the user and that input contains target text, then process 400 flows to block 406; otherwise, process 400 loops to decision block 404 to continue presentation of the target content to the user and await user input.

At block 406, a target unique identifier is generated from the input. In various embodiments, block 406 may employ embodiments of block 310 to generate the target unique identifier from the target text associated with the input. Using the example above, a target unique identifier is generated for the phrase "Bond, James Bond."

Process 400 continues after block 406 at block 408, where unique identifier/timestamp mappings are accessed for the target content being presented to the user. In various embodiments, block 408 may access the unique identifier/timestamp mappings generated at block 314 in FIG. 3. Accordingly, in some embodiments, the unique identifier/timestamp mappings for the target content are stored in a database. The database may be accessed using an identifier of the target content being presented to the user to determine or identify the particular unique identifier/timestamp mappings for that target content. In other embodiments, the unique identifier/timestamp mappings may be stored in metadata of the target content being presented to the user.

Process 400 proceeds next after block 408 at block 410, where the mappings are searched for the target unique identifier. In some embodiments, the mappings may be searched for an exact match between the unique identifier of a mapping and the target unique identifier. In other embodiments, the mappings may be searched for a unique identifier of a mapping that is within a threshold difference from the target unique identifier.

Continuing the previous example, all unique identifier/timestamp mappings for the movie "Dr. No" are searched for the target unique identifier associated with the phrase "Bond, James Bond."

Process 400 continues next after block 410 at decision block 412, where a determination is made whether the target unique identifier is found in the mappings. If the target unique identifier is found in the mappings, by either an exact match or within a similarity threshold, then process 400 flows to block 414; otherwise, process 400 loops to decision block 404 to continue presentation of the target content to the user and await additional user input.

In some embodiments, if there is no match, or similarity, between the target unique identifier and the mappings, then the input text from the user may be separated input multiple sub-text portions. A secondary target unique identifier may be generated for each separate sub-set text portion at block 406. The mappings can then be searched at block 410 for each of these secondary target unique identifiers. If a secondary target unique identifier matches or is within a similarity threshold of a unique identifier of a mapping, then process 400 flows from decision block 412 to block 414 for that secondary target unique identifier.

At block 414, a timestamp that is mapped to the target unique identifier is determined. In various embodiments, the mappings include one or more timestamps that are associated with a corresponding unique identifier. Accordingly, the one or more timestamps associated with the corresponding mapped unique identifier is obtained. The timestamps identify where in the target content the audio of the corresponding text string associated with the unique identifier can be found.

For example, in the movie "Dr. No" the phrase "Bond, James Bond" may be uttered one minute 45 seconds into the film. As a result, the mapping between the unique identifier for "Bond, James Bond" in the movie "Dr. No" may identify the timestamp as 00:01:45.

Process 400 proceeds after block 414 to block 416, playback of the target content is adjusted based on the determined timestamp. In some embodiments, the target content is fast forward or rewound to the determined timestamp. In other embodiments, the target content may be fast forward or rewound to a position relative to the determined timestamp, such as two seconds before the determined timestamp.

Continuing the example above, the movie "Dr. No" may be fast forward or rewound, or skipped, to the 00:01:45 position. In this way, the user can watch the iconic scene where James Bond says "Bond, James Bond" for the very first time in the movie "Dr. No."

In some embodiments, if a plurality of timestamps are determined for the target unique identifier, then the playback of the target content may be further adjusted after a determined amount of time or in response to input from the user. In this way, the user can view each separate portion of the target content that includes the target text input by the user.

After block 416, process 400 may loop to decision block 404 to continue presentation of the target content to the user and await additional user input.

Figure 5:
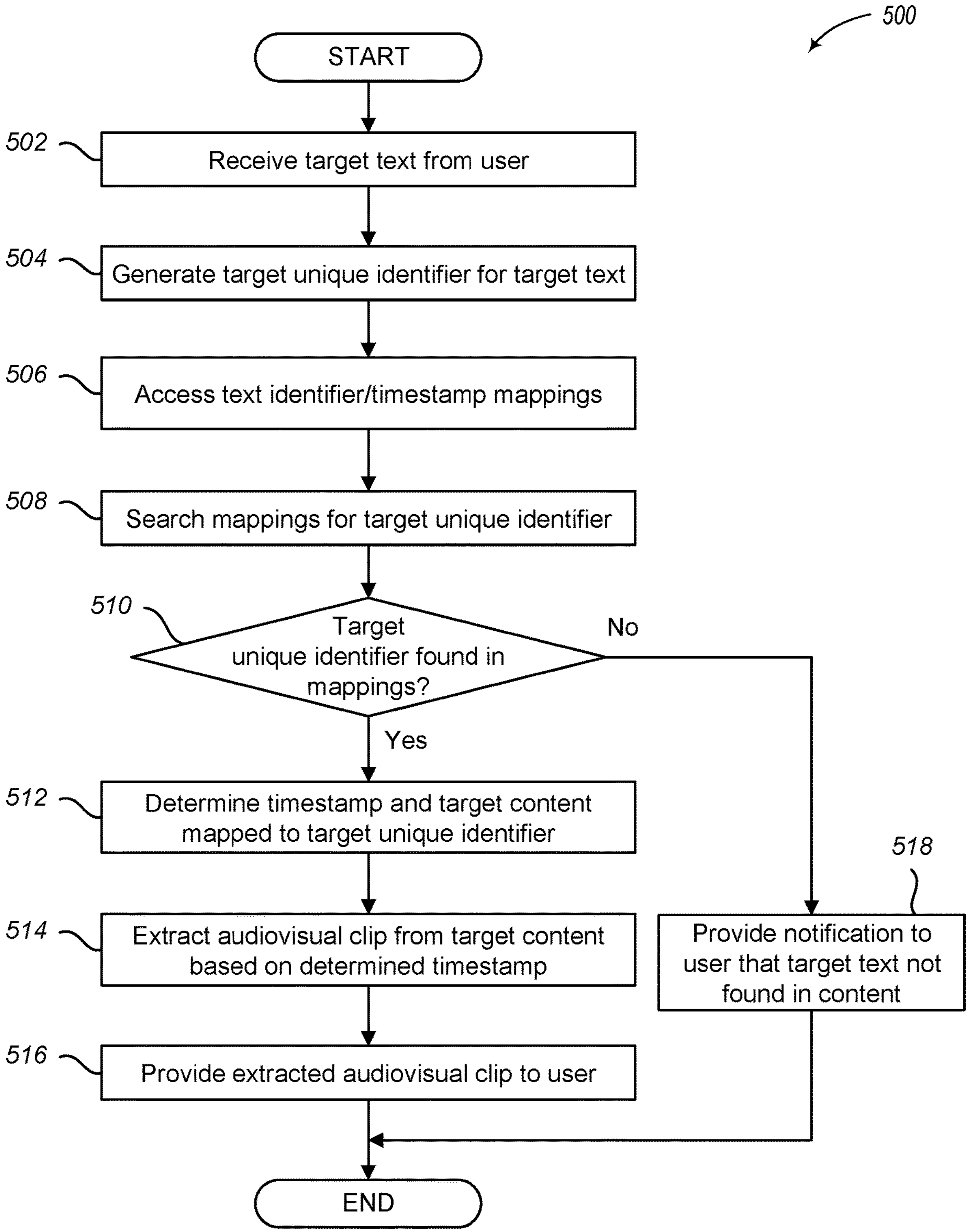
FIG. 5 illustrates a logical flow diagram showing one embodiment of a process for extracting a clip from content using a unique identifier for target text provided by a user in accordance with embodiments described herein.

FIG. 5 illustrates a logical flow diagram showing one embodiment of a process 500 for extracting a clip from content using a unique identifier for target text provided by a user in accordance with embodiments described herein.

Process 500 begins, after a start block, at block 502, where target text is received. In various embodiments, a user may input the target text by manually typing the target text into a graphical user interface. In other embodiments, the user may speak the target text into a microphone. In this situation, audio from the user's speech may be converted into the target text.

Process 500 proceeds after block 502 to block 504, where a target unique identifier is generated from the target text. In various embodiments, block 504 may employ embodiments of block 310 to generate the target unique identifier from the target text.

Process 500 continues after block 504 at block 506, where unique identifier/timestamp mappings are accessed. In various embodiments, block 506 may access the unique identifier/timestamp mappings generated at block 314 in FIG. 3. Accordingly, in some embodiments, a database of unique identifier/timestamp mappings for a plurality of content may be accessed. In other embodiments, the metadata of a plurality of content may be analyzed to access the unique identifier/timestamp mappings of each piece of content.

Process 500 proceeds next after block 506 at block 508, where the mappings are searched for the target unique identifier. In some embodiments, block 508 may employ embodiments of block 410 in FIG. 4 to search the mappings for the target unique identifier.

Process 500 continues next after block 508 at decision block 510, where a determination is made whether the target unique identifier is found in the mappings. In various embodiments, decision block 510 may employ embodiments of block 412 in FIG. 4 to determine if the target unique identifier is found in the mappings. If the target unique identifier is found in the mappings, then process 500 flows to block 512; otherwise, process 500 flows to block 518.

At block 518, a notification is provided to the user indicating that the target text cannot be located in the content. After block 518, process 500 terminates or otherwise returns to a calling process to perform other actions.

If, at decision block 510, the target unique identifier is found in the mappings, then process 500 flows from decision block 510 to block 512. In some embodiments, if there is no match, or similarity, between the target unique identifier and the mappings at decision block 510, then the target text from the user may be separated input multiple sub-text portions. A secondary target unique identifier may be generated for each separate sub-set text portion at block 504. The mappings can then be searched at block 508 for each of these secondary target unique identifiers. If a secondary target unique identifier matches or is within a similarity threshold of a unique identifier of a mapping, then process 500 flows from decision block 510 to block 512 for that secondary target unique identifier.

At block 512, target content and a corresponding timestamp that are mapped to the target unique identifier are determined. In various embodiments, the target content and the corresponding timestamp are obtained from the mapping that corresponds to the unique identifier.

Similar to the example above, if the user wants to find movie clips where James Bond says "Bond, James Bond," then the mappings are search for the unique identifier for "Bond, James Bond." In response, each movie that contains the phrase "Bond, James Bond" is identifier from the mapping, along with one or more timestamps within those movies for when the phrase is uttered.

Process 500 proceeds after block 512 to block 514, where an audiovisual clip is extracted from the target content based on the determined timestamp. In some embodiments, the clip may begin at the timestamp. In other embodiments, the clip may begin at a selected amount prior to the timestamp, such as two seconds.

In various embodiments, the length of the clip may be based on a predetermined duration. In other embodiments, the user may input the duration of the clip. In yet other embodiments, the duration may be determined based on the amount of time associated with the text string used to generate the unique identifier of the mapping.

Continuing the example above, an audiovisual clip may be extracted from each identified James Bond movie based on the identified timestamps. In some embodiments, separate audiovisual clips may be generated for each instance the phrase is uttered. In other embodiments, a single audiovisual clip may be generated from a concatenation or combination of each individual clip.

Process 500 continues after block 514 at block 516, where the extracted audiovisual clip is provided to the user. In some embodiments, the extracted audiovisual clip is provided to a user device of the user, which can then present the clip to the user.

As described herein, the mapping for a specific unique identifier may include one corresponding timestamp or a plurality of timestamps. Likewise, the mapping for a specific unique identifier may include one corresponding target content or a plurality of corresponding target content. Accordingly, a separate audiovisual clip may be extracted for each separate timestamp of each separate target content mapped to the target unique identifier. In this way, the user can be provided a plurality of clips from different content that share the text string used to generate the target unique identifier.

After block 516, process 500 terminates or otherwise returns to a calling process to perform other actions.

Figure 6:
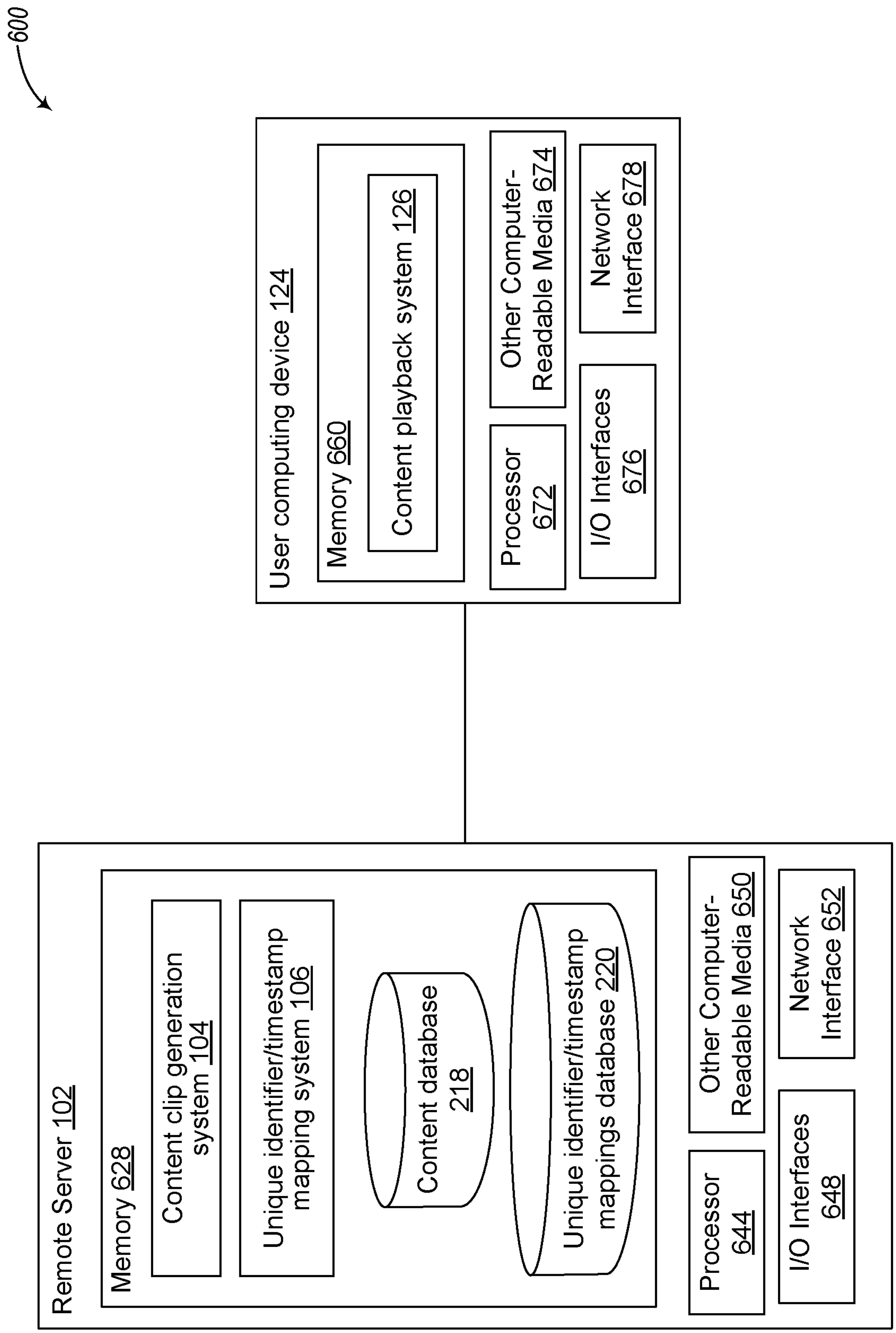
FIG. 6 shows a system diagram that describes one implementation of computing systems for implementing embodiments described herein.

FIG. 6 shows a system diagram that describes one implementation of computing systems for implementing embodiments described herein. System 600 includes remote server 102 and user computing device 124, similar to what is described above in conjunction with FIGS. 1 and 2.

As described herein, the remote server 102 is a computing device that can perform functionality described herein for generating text-based unique identifier/timestamp mappings for content and generating extracted content clips using the mappings and user-provided text. One or more special purpose computing systems may be used to implement the remote server 102. Accordingly, various embodiments described herein may be implemented in software, hardware, firmware, or in some combination thereof. The remote server includes memory 628, processor 644, network interface 648, input/output (I/O) interfaces 650, and other computer-readable media 652.

Processor 644 includes one or more processors, one or more processing units, programmable logic, circuitry, or one or more other computing components that are configured to perform embodiments described herein or to execute computer instructions to perform embodiments described herein. In some embodiments, a processor system of the remote server 102 may include a single processor 644 that operates individually to perform actions. In other embodiments, a processor system of the remote server 102 may include a plurality of processors 644 that operate to collectively perform actions, such that one or more processors 644 may operate to perform some, but not all, of such actions. Reference herein to "a processor system" of the remote server 102 refers to one or more processors 644 that individually or collectively perform actions. And reference herein to "the processor system" of the remote server 102 refers to 1) a subset or all of the one or more processors 644 comprised by "a processor system" of the remote server 102 and 2) any combination of the one or more processors 644 comprised by "a processor system" of the remote server 102 and one or more other processors 644.

Memory 628 may include one or more various types of non-volatile or volatile storage technologies. Examples of memory 628 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 628 may be utilized to store information, including computer-readable instructions that are utilized by a processor system of one or more processors 644 to perform actions, including at least some embodiments described herein.

Memory 628 may have stored thereon content clip generation system 104 and content text identifier generation system 106. The content text identifier generation system 106 is configured to generate unique identifier/timestamp mappings for a plurality of content, where the unique identifiers are generated from text strings that correspond to audio of the content and the timestamps indicate where in the content that audio occurs. The content clip generation system 104 is configured to receive target text from user computing device 124, identify unique identifier/timestamp mappings for the target text, generate an audiovisual clip based on the mappings, and provide the clip to the user computing device 124 for presentation to a user.

Memory 628 may include content database 218 and unique identifier/timestamp mappings database 220. The content database 218 may store a plurality of content, as described herein. And the unique identifier/timestamp mappings database 220 may store a plurality of mappings between unique identifiers and timestamps for the content in content database 218, as described herein.

Network interface 652 is configured to communicate with other computing devices, such as to receive input from user computing device 124 and to provide target content to the user computing device 124. I/O interfaces 648 may include interfaces for various input or output devices, such as USB interfaces, physical buttons, keyboards, haptic interfaces, tactile interfaces, or the like. Other computer-readable media 652 may include other types of stationary or removable computer-readable media, such as removable flash drives, external hard drives, or the like.

As described herein, the user computing device 124 is a computing device that can perform functionality described herein for receiving user input that contains target text, presenting content to the user, and adjusting playback of the content based on the user input and the unique identifier/timestamp mappings. One or more special purpose computing systems may be used to implement the user computing device 124. Accordingly, various embodiments described herein may be implemented in software, hardware, firmware, or in some combination thereof. The user computing device 124 includes memory 660, processor 672, network interface 678, input/output (I/O) interfaces 648, and other computer-readable media 674.

Processor 672 may be an embodiment of process 644. Accordingly, a processor system of the user computing device 124 may include a single processor 672 that operates individually to perform actions. In other embodiments, a processor system of the user computing device 124 may include a plurality of processors 672 that operate to collectively perform actions, such that one or more processors 644 may operate to perform some, but not all, of such actions. Reference herein to "a processor system" of the user computing device 124 refers to one or more processors 672 that individually or collectively perform actions. And reference herein to "the processor system" of the user computing device 124 refers to 1) a subset or all of the one or more processors 672 comprised by "a processor system" of the user computing device 124 and 2) any combination of the one or more processors 672 comprised by "a processor system" of the user computing device 124 and one or more other processors 672.

Memory 660 may be similar to memory 628. Memory 660 may be utilized to store information, including computer-readable instructions that are utilized by a processor system of one or more processors 672 to perform actions, including at least some embodiments described herein.

Memory 660 may have stored thereon content playback system 126, which is configured to enable a user to provide input and to present or adjust playback of the content based on the input, as described herein.

Network interface 678 is configured to communicate with other computing devices, such as remote server 102. I/O interfaces 676 may include interfaces for various input or output devices, such as USB interfaces, physical buttons, keyboards, haptic interfaces, tactile interfaces, or the like. Other computer-readable media 674 may include other types of stationary or removable computer-readable media, such as removable flash drives, external hard drives, or the like.

The following is a summarization of the claims as originally filed.

A method may be summarized as comprising: accessing a plurality of audiovisual content; for each corresponding content of the plurality of content: converting an audio portion of the corresponding content into a plurality of text strings; and for each corresponding text string of the plurality of text strings: generating a unique identifier for the corresponding text string; determining a timestamp for the corresponding text string within the corresponding content; and storing a mapping between the timestamp and the unique identifier for the corresponding text string for the corresponding content; receiving input from a user; determining a target unique identifier based on the input; employing the target unique identifier and the mappings between timestamps and unique identifiers to identify target content for the user; and presenting the target content to the user.

The method may determine the target unique identifier based on the input including: converting the input to target text; and generating the target unique identifier based on the target text.

The method may employ the target unique identifier and the mappings between timestamps and unique identifiers to identify target content for the user including: searching the stored mappings for the target unique identifier; identifying a target timestamp associated with the target unique identifier; and adjusting playback of the target content based on the target timestamp.

The method may employ the target unique identifier and the mappings between timestamps and unique identifiers to identify target content for the user including: searching the stored mappings for the target unique identifier; identifying content and a target timestamp associated with the target unique identifier; and extracting the target content from the identified content based on the target timestamp.

The method may employ the target unique identifier and the mappings between timestamps and unique identifiers to identify target content for the user including: employing the target unique identifier and the mappings between timestamps and unique identifiers to identify second target content for the user; and presenting the second target content to user.

The method may employ the target unique identifier and the mappings between timestamps and unique identifiers to identify target content for the user including: searching the stored mappings for the target unique identifier; identifying a plurality of target content and corresponding target timestamps associated with the target unique identifier for each of the plurality of target content; and extracting a plurality of content clips as the target content from the plurality of target content based on the corresponding target timestamps.

Each text string of the plurality of text strings in the method may include a plurality of words.

The method may convert the audio portion of the corresponding content into the plurality of text strings including: employing audio-to-text mechanism on the audio portion of the corresponding content to generate a plurality of text; identifying pause points within the audio portion; and generating the plurality of text strings from the plurality of text based on the pause points.

The method may store the mapping between the timestamp and the unique identifier for the corresponding text string for the corresponding content including: storing the mapping in metadata of the corresponding content.

The method may store the mapping between the timestamp and the unique identifier for the corresponding text string for the corresponding content including: storing the mapping in a database containing a plurality of mappings between timestamps and unique identifiers for the plurality of content.

A system may be summarized as, comprising: a remote server configured to: convert an audio portion of each corresponding content of a plurality of content into a plurality of text strings; generate unique identifiers for each unique text string of the plurality of text string; determine timestamps and the corresponding content for each unique identifier based on when each unique text string occurs within the plurality of content; and store mappings between the timestamps, the unique identifiers, and the corresponding content for the plurality of text strings; and enable a user device to adjust playback of target content based on user input and the stored mappings.

The system may further comprise: a user device configured to: receive the user input from a user for target content from the plurality of content; determine a target unique identifier based on the input; employ the target unique identifier and the stored mappings to identify target timestamp within the target content; and adjust playback of the target content based on the target timestamp.

The user device of the system may determine the target unique identifier based on the input by being further configured to: convert the input to target text; and generate the target unique identifier based on the target text.

The user device of the system may employ the target unique identifier and the stored mappings to identify target content for the user by being further configured to: employ the target unique identifier and the mappings between timestamps and unique identifiers to identify a second target timestamp within the target content; and adjust playback of the target content based on the second target timestamp.

Each text string of the plurality of text strings may include a plurality of words.

The remote server of the system may convert the audio portion of each corresponding content into the plurality of text strings by being further configured to: employ an audio-to-text mechanism on the audio portion of each corresponding content to generate a plurality of text; identify pause points within the audio portion for each corresponding content; and generate the plurality of text strings from the plurality of text based on the pause points.

Another system may be summarized as comprising: a remote server and a user device. The remote server may be configured to: convert an audio portion of each corresponding content of a plurality of content into a plurality of text strings; generate unique identifiers for each unique text string of the plurality of text string; determine timestamps and the corresponding content for each unique identifier based on when each unique text string occurs within the plurality of content; and store mappings between the timestamps, the unique identifiers, and the corresponding content for the plurality of text strings; receive input from a user; determine a target unique identifier based on the input; employ the target unique identifier and the stored mappings to identify target content from the plurality of content and a target timestamp within the target content; and generate a clip from the target content based on the target timestamp. And the user device may be configured to: receive the input from a user; provide the input to the remote server; receive the clip from the remote server; and present the clip to the user.

The remote server of the system may determine the target unique identifier based on the input by being further configured to: convert the input to target text; and generate the target unique identifier based on the target text.

Each text string of the plurality of text strings may include a plurality of words.

The remote serve of the system may store the mappings between the timestamps, the unique identifiers, and the corresponding content text string for the corresponding content by being further configured to: store the mapping in metadata of the corresponding content.

The remote serve of the system may store the mappings between the timestamps, the unique identifiers, and the corresponding content text string for the corresponding content by being further configured to: store the mappings in a database containing a plurality of mappings for the plurality of content.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
accessing a plurality of audiovisual content;
for each corresponding content of the plurality of content:
converting an audio portion of the corresponding content into a plurality of text strings; and
for each corresponding text string of the plurality of text strings:
assigning each word in the corresponding text string a first value;
combining the first value of each word in the corresponding text string to generate a unique identifier for the corresponding text string;
determining a timestamp for the corresponding text string within the corresponding content; and
storing a mapping between the timestamp and the unique identifier for the corresponding text string for the corresponding content;
receiving input from a user;
assigning each word from the input a second value;
combining the second value of each word from the input to determine a target unique identifier based on the input;
employing the target unique identifier and the mappings between timestamps and unique identifiers to identify target content for the user; and
presenting the target content to the user.

2. The method of claim 1, wherein employing the target unique identifier and the mappings between timestamps and unique identifiers to identify target content for the user comprises:
searching the stored mappings for the target unique identifier;
identifying a target timestamp associated with the target unique identifier; and
adjusting playback of the target content based on the target timestamp.

3. The method of claim 1, wherein employing the target unique identifier and the mappings between timestamps and unique identifiers to identify target content for the user comprises:
searching the stored mappings for the target unique identifier;
identifying content and a target timestamp associated with the target unique identifier; and
extracting the target content from the identified content based on the target timestamp.

4. The method of claim 1, wherein employing the target unique identifier and the mappings between timestamps and unique identifiers to identify target content for the user comprises:
employing the target unique identifier and the mappings between timestamps and unique identifiers to identify second target content for the user; and
presenting the second target content to user.

5. The method of claim 1, wherein employing the target unique identifier and the mappings between timestamps and unique identifiers to identify target content for the user comprises:
searching the stored mappings for the target unique identifier;
identifying a plurality of target content and corresponding target timestamps associated with the target unique identifier for each of the plurality of target content; and
extracting a plurality of content clips as the target content from the plurality of target content based on the corresponding target timestamps.

6. The method of claim 1, wherein each text string of the plurality of text strings includes a plurality of words.

7. The method of claim 1, wherein converting the audio portion of the corresponding content into the plurality of text strings comprises:
employing audio-to-text mechanism on the audio portion of the corresponding content to generate a plurality of text;
identifying pause points within the audio portion; and
generating the plurality of text strings from the plurality of text based on the pause points.

8. The method of claim 1, where storing the mapping between the timestamp and the unique identifier for the corresponding text string for the corresponding content comprises:
storing the mapping in metadata of the corresponding content.

9. The method of claim 1, where storing the mapping between the timestamp and the unique identifier for the corresponding text string for the corresponding content comprises:
storing the mapping in a database containing a plurality of mappings between timestamps and unique identifiers for the plurality of content.

10. A system, comprising:
a remote server configured to:
convert an audio portion of each corresponding content of a plurality of content into a plurality of text strings;
generate a unique identifier for each corresponding unique text string of the plurality of text strings, including:
assign each word in the corresponding unique text string a first value;
combine the first value of each word in the corresponding unique text string to generate the unique identifier for the corresponding unique text string;
determine timestamps and the corresponding content for each unique identifier based on when each unique text string occurs within the plurality of content; and
store mappings between the timestamps, the unique identifiers, and the corresponding content for the plurality of text strings; and
a user device configured to:
receive user input from a user for target content;
assign each word from the user input a second value;
combine the second value of each word from the user input to determine a target unique identifier based on the user input;

employ the target unique identifier and the stored mappings to identify target timestamp within the target content; and adjust playback of the target content based on the target timestamp.

11. The system of claim 10, wherein the user device employs the target unique identifier and the stored mappings to identify target content for the user by being further configured to:

employ the target unique identifier and the mappings between timestamps and unique identifiers to identify a second target timestamp within the target content; and adjust playback of the target content based on the second target timestamp.

12. The system of claim 10, wherein the remote server converts the audio portion of each corresponding content into the plurality of text strings by being further configured to:

employ an audio-to-text mechanism on the audio portion of each corresponding content to generate a plurality of text;

identify pause points within the audio portion for each corresponding content; and generate the plurality of text strings from the plurality of text based on the pause points.

13. A system, comprising:

a remote server configured to:

convert an audio portion of each corresponding content of a plurality of content into a plurality of text strings;

generate unique identifiers each corresponding unique text string of the plurality of text strings, including:

assign each word in the corresponding unique text string a first value;

combine the first value of each word in the corresponding unique text string to generate the unique identifier for the corresponding unique text string;

determine timestamps and the corresponding content for each unique identifier based on when each unique text string occurs within the plurality of content; and store mappings between the timestamps, the unique identifiers, and the corresponding content for the plurality of text strings;

receive input from a user;

assign each word from the input a second value;

combine the second value of each word from the input to determine a target unique identifier;

employ the target unique identifier and the stored mappings to identify target content from the plurality of content and a target timestamp within the target content; and generate a clip from the target content based on the target timestamp; and a user device configured to:

receive the input from a user;

provide the input to the remote server;

receive the clip from the remote server; and present the clip to the user.

14. The system of claim 13, wherein the remote serve stores the mappings between the timestamps, the unique identifiers, and the corresponding content text string for the corresponding content by being further configured to:

store the mapping in metadata of the corresponding content.

15. The system of claim 13, wherein the remote serve stores the mappings between the timestamps, the unique identifiers, and the corresponding content text string for the corresponding content by being further configured to:

store the mappings in a database containing a plurality of mappings for the plurality of content.

* * * * *